United States Patent
Dillingham (10) Patent No.: US 10,260,208 B1
(45) Date of Patent: Apr. 16, 2019

(54) ALL ELECTRIC POTHOLE PATCHER

(71) Applicant: H. D. Industries, Inc., Jacksonville, TX (US)

(72) Inventor: Harold W. Dillingham, Jacksonville, TX (US)

(73) Assignee: H. D. Industries, Inc., Jacksonville, TX (US)

( * ) Notice: Subject to any disclaimer, the term of this patent is extended or adjusted under 35 U.S.C. 154(b) by 0 days.

(21) Appl. No.: 15/926,351

(22) Filed: Mar. 20, 2018

(51) Int. Cl.
*E01C 19/08* (2006.01)
*E01C 23/10* (2006.01)

(52) U.S. Cl.
CPC .............. *E01C 23/10* (2013.01); *E01C 19/08* (2013.01)

(58) Field of Classification Search
CPC .................................. E01C 23/10; E01C 19/08
USPC ........................................ 404/84.05, 101, 79
See application file for complete search history.

(56) References Cited

U.S. PATENT DOCUMENTS

| | | | |
|---|---|---|---|
| 4,196,827 A | 4/1980 | Leafdale | |
| 4,695,186 A * | 9/1987 | King | E01C 23/06 126/343.5 A |
| 4,944,632 A | 7/1990 | Dillingham | |
| 5,419,654 A * | 5/1995 | Kleiger | E01C 19/46 366/22 |
| 5,988,935 A | 11/1999 | Dillingham | |
| 6,012,870 A | 1/2000 | Dillingham | |
| 6,681,761 B2 | 1/2004 | Dillingham | |
| 7,264,694 B2 * | 9/2007 | Merrell | B01J 6/004 201/19 |
| 7,458,746 B1 * | 12/2008 | Zimmerman | E01C 19/1054 404/101 |
| 8,016,516 B2 | 9/2011 | Johnson et al. | |
| 9,068,296 B1 * | 6/2015 | Hulicsko | E01C 23/06 |
| 9,132,570 B2 * | 9/2015 | Trimborn | E01C 19/08 |
| 9,416,499 B2 * | 8/2016 | Cronin | E01C 23/01 |
| 9,587,357 B1 * | 3/2017 | Alhalawani | E01C 11/005 |
| 9,587,358 B2 * | 3/2017 | Roy | E01C 19/1004 |
| 2004/0240939 A1 * | 12/2004 | Hays | E01C 19/182 404/95 |

OTHER PUBLICATIONS

Bergkamp FP5 Flameless Pothole Patcher Brochure, Wayback Machine, Jan. 4, 2016; 7 pages; www.bergkampinc.com.

* cited by examiner

*Primary Examiner* — Raymond W Addie
(74) *Attorney, Agent, or Firm* — Whitaker Chalk Swindle & Schwartz PLLC; Charles Gunter (57) ABSTRACT

A portable device is shown for transporting asphalt repair materials for use in repairing potholes in asphalt pavements. The device has a body with a hopper compartment for transporting and dispensing asphalt mix materials. A pair of electric heaters are submerged in a heating chamber located below the hopper compartment for heating the asphalt mix. Tack oils are held and dispensed from a separate tack oil tank.

7 Claims, 5 Drawing Sheets

ALL ELECTRIC POTHOLE PATCHER

BACKGROUND OF THE INVENTION

1. Field of the Invention

The present invention relates generally to truck and/or trailer mounted portable devices for dispensing pavement repair materials and, specifically, to such a portable device for dispensing repair materials for asphalt pavements.

2. Description of the Prior Art

In the past, as many as three vehicles were sometimes needed to repair openings and potholes in asphalt, concrete and other roadway surfaces. One vehicle provided an air compressor for use with various pneumatic repair tools which were used to dress the hole, crack or cavity to be filled. Another vehicle contained liquid asphalt tack material which would be sprayed into the dressed cavity, and a third vehicle would deliver asphalt mix material to the cavity. The asphalt would then be packed, compacted and leveled by hand to complete the repair.

U.S. Pat. No. 4,196,827, issued Apr. 8, 1980, entitled "Portable Machine For Transporting Heated Asphalt Products For Use In Repair Asphalt Pavement" shows a portable machine which was designed to incorporate all phases of the pavement repair into one mobile unit. The machine has a hopper for transporting asphalt mix, and a reservoir below the hopper having a heat source. The heat source was a propane fueled retort style heater. The reservoir contained liquid asphalt tack material. The heat source is used to heat the liquid tack material, and the tack material is used to heat the asphalt mix in the hopper by heat transfer. Asphalt tack material is also dispensed from the tack material tank by means of spray equipment connected to a discharge valve on the rear of the truck.

U.S. Pat. No. 4,944,632, issued Jul. 31, 1990, entitled "Device For Dispensing Asphalt Repair Materials", assigned to the assignee of the present invention, shows an improved device of the same general type used for transporting asphalt repair materials for use in repairing potholes in asphalt pavements. The device has a body with a hopper compartment for transporting and dispensing asphalt mix materials. A separate tack oil tank is provided with an internal circulation system for maintaining liquid tack oils in an emulsified state. A heat transfer oil tank was located below the hopper compartment and was heated by a retort tube propane burner.

U.S. Pat. No. 5,988,935, issued Nov. 23, 21999, entitled "Asphalt Repair Apparatus With Dry, Heat Source" and U.S. Pat. No. 6,681,761, issued Jan. 27, 2004, entitled "Exhaust Damper System For Asphalt Heating Device", both assigned to the assignee of the present invention show additional improvements in this same basic design of asphalt repair machine. Both of these devices featured a hopper compartment which was heated by a dry radiant heat source which was heated by a propane retort tube burner.

While the above devices represented an advance in the relevant arts at the time, there is also a need in some circumstances for an asphalt repair device of this general type which utilizes some type of heat source for the asphalt repair materials other than a propane heat tube retort heat source.

Further, there exists a need on some occasions to have such an asphalt repair device which does not rely on a dry radiant heat source, but which can utilize an all-electric heat source for heating the various asphalt repair materials which may be carried and dispensed.

There also exists a need for such an asphalt repair device with a heat source that safely and effectively heats the asphalt repair materials without hardening, burning or charring such materials.

SUMMARY OF THE INVENTION

The portable apparatus of the invention is used to transport heated pavement repair materials for use in repairing roadways and other traffic bearing surfaces. The device includes a body adapted to be mounted on a portable base for transporting the body to a repair site. The body has a hopper compartment with a V-shaped bottom wall for transporting asphalt mix material and a generally V-shaped heating chamber located below the hopper compartment. The V-shaped bottom wall of the hopper compartment defines an upper extent of the heating chamber. An auger or screw conveyor is mounted in the bottom of the hopper compartment for dispensing asphalt mix materials therefrom. An agitator, such as a paddle shaft, is located above the auger in the hopper compartment for agitating the hopper materials.

An all-electric heat source is associated with the heating chamber for heating the chamber and for transferring heat to the hopper compartment through the hopper bottom wall. Preferably, the all-electric heat source comprises a pair of oppositely arranged electric heaters located within the heating chamber on either side of the V-shaped bottom wall of the hopper. The electric heaters being heated by an electric generator also mounted on the body of the device, whereby the electric heaters can be used to supply heat to the bottom wall of the hopper to maintain the asphalt mix materials in a workable state. The V-shaped bottom wall of the hopper compartment forms an upper, uninsulated common wall of the heating chamber, the heating chamber having an insulated bottom wall and insulated side walls.

Most preferably, the electric heaters which make up the all-electric heat source for the hopper compartment are 208 to 240 volt AC single phase electric resistance heaters. The heating chamber is a sealed heat transfer oil chamber, the chamber being sealed once the electric heaters are installed and the chamber is filled with heat transfer oil. The on-board electric generator which is used to power the electric heaters can conveniently be a PTO hydraulically driven generator.

A method is also shown for repairing a pothole in an asphalt pavement using the previously described device. The preferred method comprises the steps of:

providing a body on a portable base for transporting the body to a repair site, the body being equipped with a hopper compartment with a V-shaped bottom wall for transporting asphalt mix materials and a generally V-shaped heating chamber located below the hopper compartment, the V-shaped bottom wall of the hopper compartment defining an upper extent of the heating chamber;

providing a screw conveyor mounted in the bottom of the hopper compartment for dispensing asphalt mix materials therefrom;

providing a paddle shaft located above the screw conveyor in the hopper compartment for agitating the hopper materials;

utilizing an all-electric heat source associated with the heating chamber for heating the chamber and for transferring heat to the hopper compartment through the hopper bottom wall to maintain the asphalt mix materials in a workable state; and dispensing asphalt mix materials from the hopper compartment to fill and repair the pothole.

Preferably, in the improved method of the invention, the heat is supplied to the heating chamber by means of a pair of oppositely arranged electric heaters located within the heating chamber on either side of the V-shaped bottom wall of the hopper, the electric heaters being heated by an electric generator also mounted on the body of the device, whereby the electric heaters can be used to supply heat to the bottom wall of the hopper to maintain the asphalt mix materials in a workable state.

Additional objects, features and advantages will be apparent from the written description which follows.

DETAILED DESCRIPTION OF THE INVENTION

The present invention provides an all electric pothole patcher which meets the foregoing objectives. The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

The advantages of present invention can perhaps best be understood with reference to Applicant's prior art device which utilized a propane retort heater system and a liquid heat transfer medium. Accordingly, turning to FIG. 3, the prior art asphalt dispensing apparatus 101 includes a body 103 which is adapted to be mounted on a portable base. The body has a hopper compartment 105 (FIG. 3) with a V-shaped bottom wall 107 for transporting asphalt mix materials. In this discussion, "asphalt mix" materials will be taken to mean pre-mix or aggregate hot or cold mix asphalt and asphalt aggregate. The term "liquid asphalt emulsion" or "tack oil" will be taken to mean asphaltic cements, liquid asphalts, and asphalt emulsions of the type carried in a separate tack oil tank, as will be described.

Figure 4:
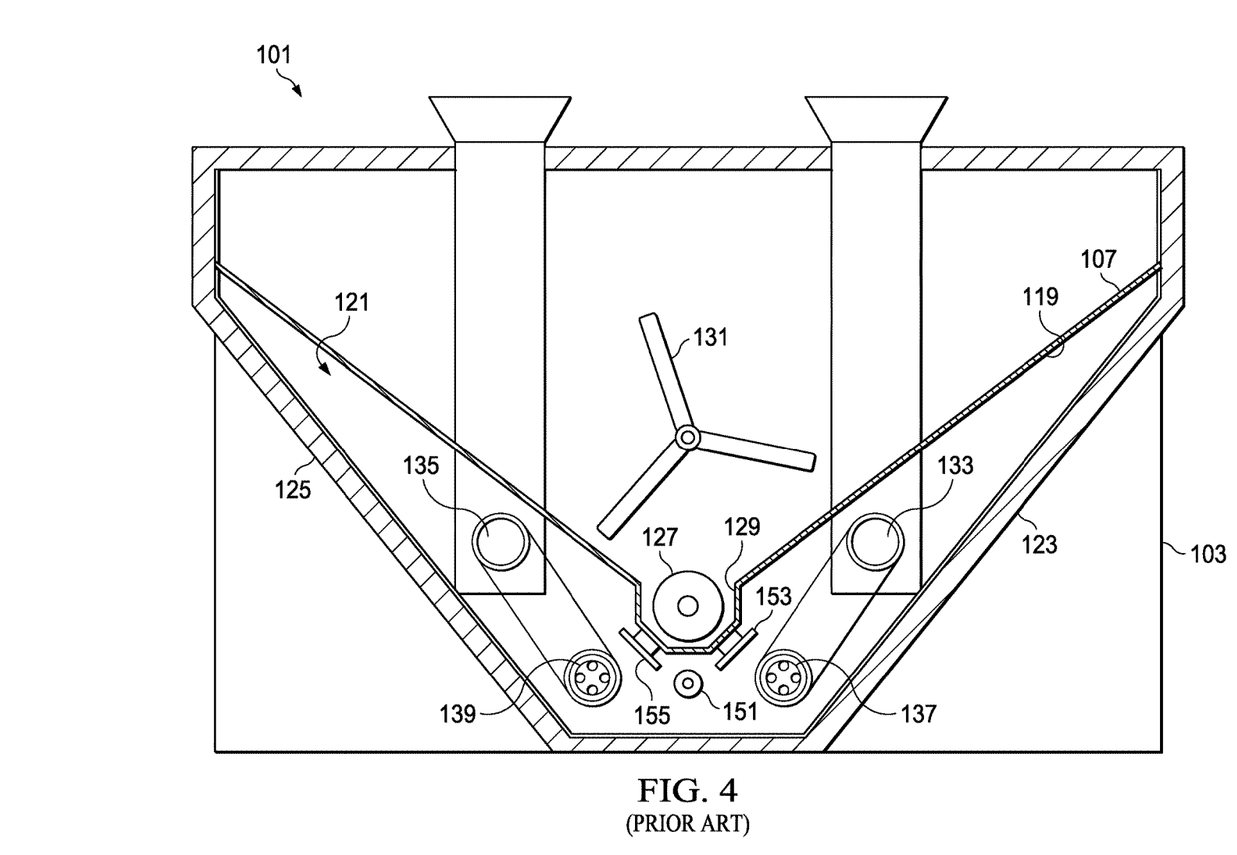
FIG. 4 is an end view of the prior art device of FIG. 3, in partial cross-section.

As best seen in FIG. 4, the V-shaped bottom wall of the hopper compartment forms an upper, uninsulated common wall 119 of a V-shaped heating chamber 121. The V-shaped heating chamber 121 is thus located below the hopper compartment 115 with the V-shaped bottom wall of the hopper compartment defining an upper extent of the heating chamber 121. The heating chamber also has oppositely extending, insulated bottom wall portions 123, 125, as shown in FIG. 6.

Figure 5:
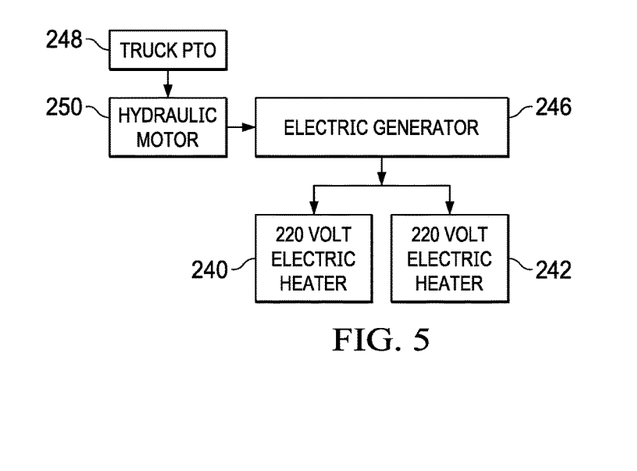
FIG. 5 is simplified block diagram showing the hydraulic power system used to power the electrical generator used in the practice of the invention.
Figure 6:
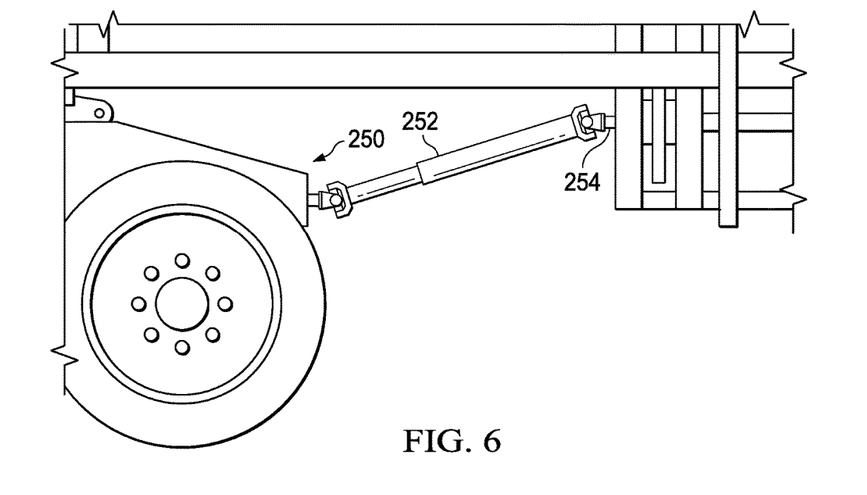
FIG. 6 is simplified, side view of a truck mounted PTO used to power the electrical generator of FIG. 6.

As shown in FIGS. 5 and 6, the body 103 of the portable device is also equipped with an auger or screw conveyor 127 which is mounted in the bottom region 129 of the hopper which forms a trough-like opening extending longitudinally along the bottom wall thereof. The screw conveyor 127 is used to dispense asphalt mix materials contained within the hopper. An agitator means, such as paddle shaft 131 is located above the screw conveyor 127 in the hopper compartment 115 for agitating the hopper materials contained therein.

The present invention is directed to improvements in the heating system used to heat the hopper compartment and the heat transfer compartment, and to the mechanism for transferring heat to the bottom wall (119 in FIG. 4) of the hopper compartment for maintaining the asphalt repair materials contained therein in a workable state.

Figure 3:
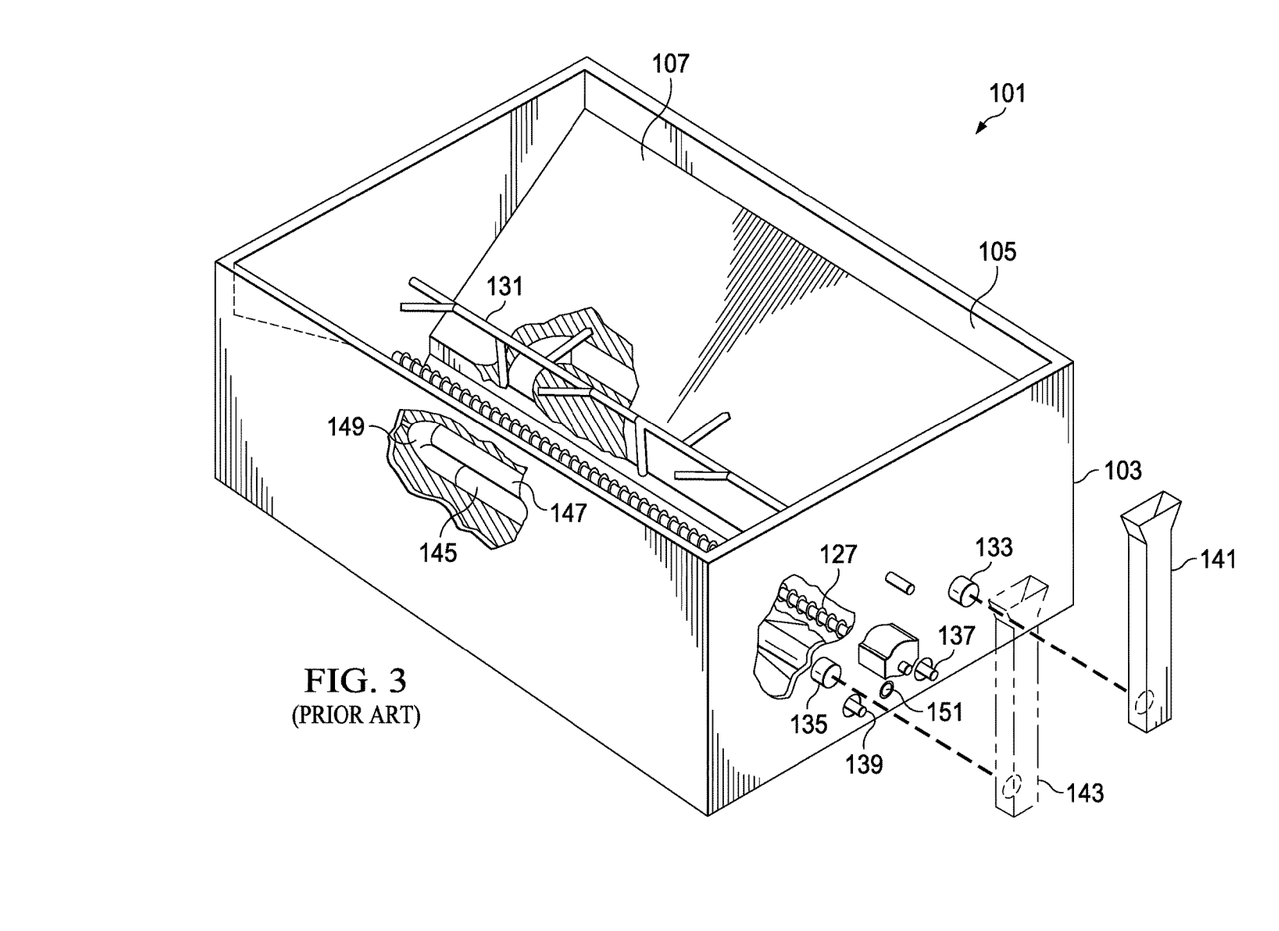
FIG. 3 is a top, perspective view, similar to FIG. 1, of a prior art device for transporting asphalt repair materials.

In the case of the prior art device shown in FIGS. 3 and 4, a dry heat means is associated with the heating chamber 121 for heating the chamber and for transferring heat to the hopper compartment 115 through the hopper bottom wall 119 to maintain the asphalt mix materials contained therein in a workable state. In the prior art device, the dry heat means comprised a pair of oppositely arranged retort tubes 133, 135 which are located within the heating chamber 121 on either side of the V-shaped bottom wall of the hopper. The retort tubes are each heated by a 150,000 btu retort tube propane burner. The burners are thermostatically controlled and regulated at 10 psi. The burners utilized commercially available ignition systems, such as a 12 volt DC electronic igniter. The gas burner is preferably provided with a safety shut-off on loss of flame or excessive temperature. The commercially available burner, ignition and safety shut-off system for the retort tubes can be obtained from H. D. Industries, Inc., of Jacksonville, Tex. The commercially available burner has two stages, ignites on 10 ounces of pressure and operates at 10 psi. The retort tubes are used to supply dry, radiant heat to the bottom wall of the hopper compartment.

As shown in FIGS. 3 and 4, each retort tube 133, 135 forms a single pass loop which has a burner 137, 139 installed at one extent thereof and which communicates with an exhaust conduit such as exhaust stacks 141, 143 at an opposite extent thereof (FIG. 3). As best seen in FIG. 3, each retort tube 133, 135 is provided in the shape of an inclined U which is arranged in a plane which is generally parallel to a selected one of the oppositely extending, insulated bottom wall portions (123, 125 in FIG. 4) of the heating chamber 121. Each retort tube 133, 135 thus has a pair of outlets to the exterior of the tank. One of the outlets has the burner mounted therein while the other of the outlets communicates with the exhaust stacks 141, 143 as an exhaust conduit.

Each U-shaped retort tube includes a first leg 145 (FIG. 3) which contains the burner 139 and an oppositely extending second leg 147 which leads to the exhaust stack 143. The two legs 145, 147 are connected by a curved, loop portion 149. As shown in FIG. 4, the heating chamber 121 can also be provided with an electric emersion type heater 151.

As best seen in FIG. 4, the heating chamber 121 further includes a pair of heat deflectors 153, 155 which are mounted in proximity to the screw conveyor 127 of the hopper. Each heat deflector is arranged to extend along a first leg of a respective retort tube to partially shield the region of the screw conveyor from the dry heat source.

The asphalt dispensing apparatus shown in FIGS. 3 and 4, as well as the device of the invention, is intended to be truck mounted on the bed of a suitable road worthy vehicle. The device could also be a trailer mounted portable device with the device being mounted on the bed of a trailer which would be hauled by a suitable vehicle. The truck or trailer would serve as a portable base for transporting the body 101 to a repair site for repairing a pothole in an asphalt pavement.

Figure 1:
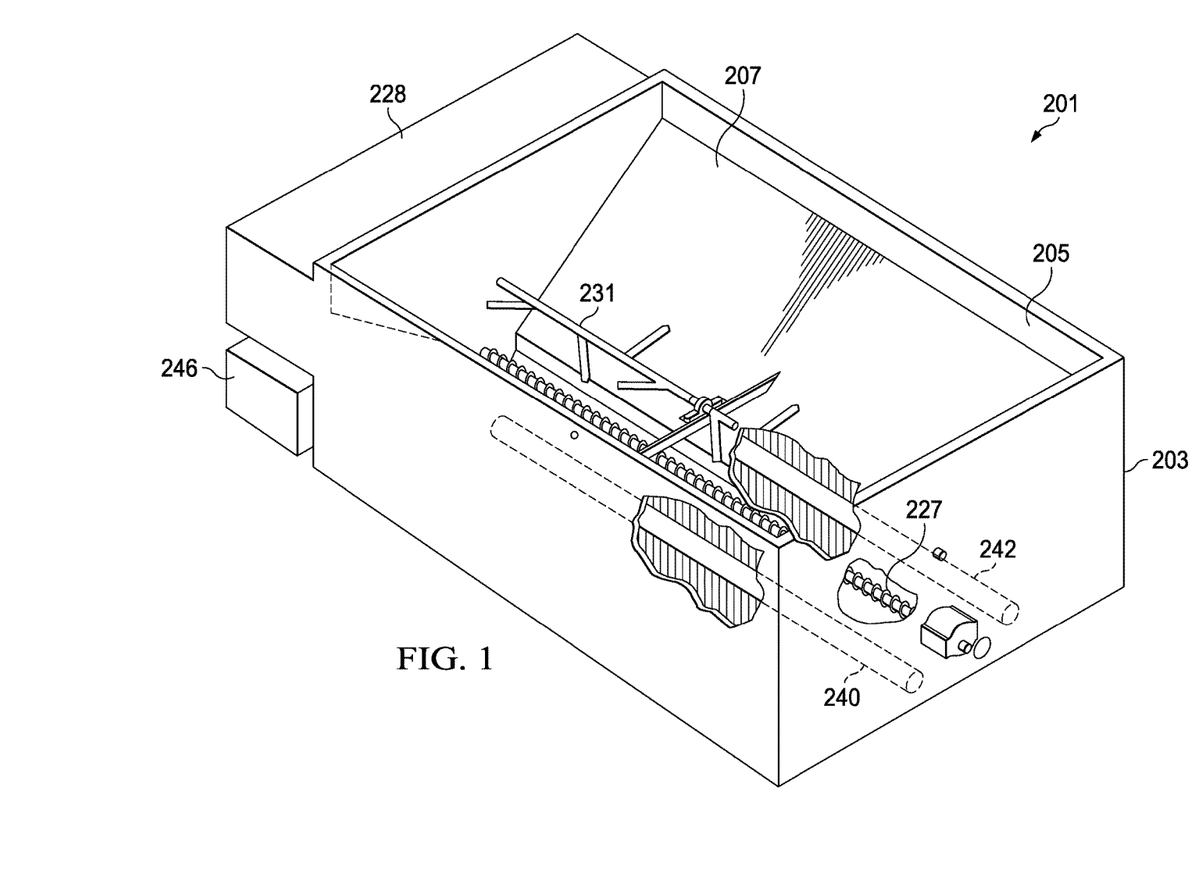
FIG. 1 is a perspective view, partly broken away, of the improved asphalt dispensing body of the invention, showing the screw conveyor, paddle shaft and all electric heat sources.
Figure 2:
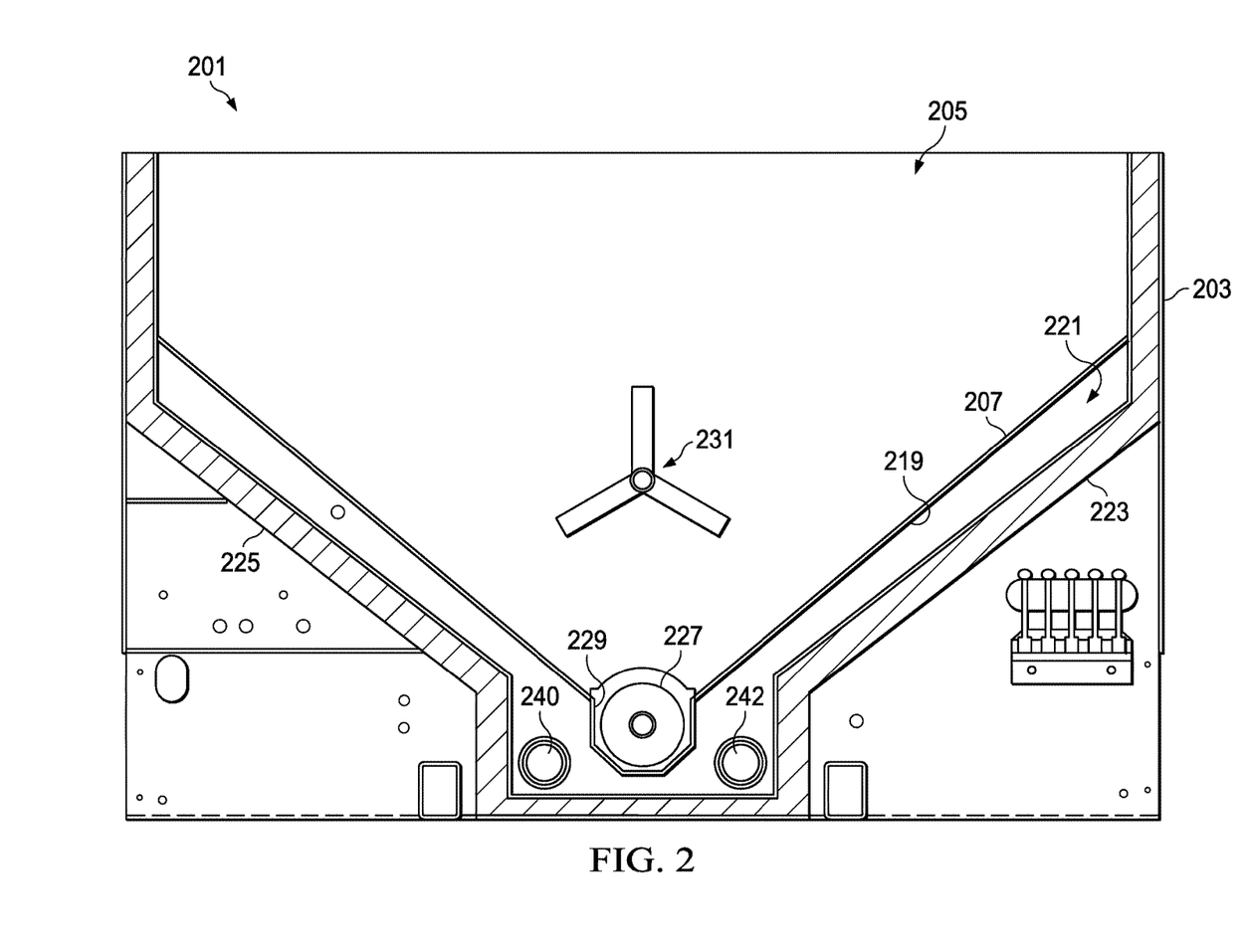
FIG. 2 is an end, partial cross-sectional view of the improved device of FIG. 1.

Turning now to FIGS. 1 and 2, there is shown the improved asphalt dispensing apparatus of the invention, designated generally as 201. The device shown in FIGS. 1 and 2 has many of the same general components as the previously described prior art device of FIGS. 3 and 4, and the corresponding parts will be numbered similarly, generally incremented by 100 in each case. Thus, the improved device includes a body 203 which is adapted to be mounted on a portable base. The body has a hopper compartment 205 (FIG. 1) with a V-shaped bottom wall 207 for transporting asphalt mix materials. As best seen in FIG. 2, the V-shaped bottom wall of the hopper compartment forms an upper, uninsulated common wall 219 of a V-shaped heating chamber 221. The V-shaped heating chamber 221 is thus located below the hopper compartment 205 with the V-shaped bottom wall of the hopper compartment defining an upper extent of the heating chamber 221. The heating chamber also has oppositely extending, insulated bottom wall portions 223, 225, as shown in FIG. 2. The hopper is fully insulated with 2" industrial, high temperature 12R factor insulation encased in a double steel jacket. 2. The V-shaped bottom wall of the hopper compartment thus forms an upper, uninsulated common wall of the heating chamber, the heating chamber having an insulated bottom wall and insulated side walls, as described.

As shown in FIGS. 1 and 2, the body 203 of the portable device is also equipped with an auger or screw conveyor 227 which is mounted in the bottom region 229 of the hopper which forms a trough-like opening extending longitudinally along the bottom wall thereof. As previously described, the screw conveyor 227 is used to dispense asphalt mix materials contained within the hopper. An agitator means, such as paddle shaft 231 is located above the screw conveyor 227 in the hopper compartment 215 for agitating the hopper materials contained therein. The screw conveyor can be, for example, 10 feet long by 6 inches diameter progressive screw conveyor with hard surfaced flights welded continuously on 2 inch scheduled 80 steel pipe and is ball bearing mounted. The conveyor is driven by a 9200 in.lb. torque variable speed hydraulic motor with forward and reverse. It is used to feed a delivery chute (not shown) with 120° of pivot. The paddle shaft 231 is used to break up asphalt due to vibratory compaction. In one embodiment, it is a schedule 160 shaft with 12 spikes and is ball bearing mounted and driven by a 9,200 in.lb. torque variable speed hydraulic motor with forward and reverse.

The apparatus of the invention may include a separate emulsion or liquid asphalt tank (such as tank 228 in FIG. 1) mounted on the portable base for transporting and dispensing liquid asphalt type materials used to dress a pothole prior to dispensing the asphalt mix materials from the hopper. The separate liquid asphalt tank could take the form of, for example, the tank described in issued U.S. Pat. No. 4,944,632, supra, assigned to the assignee of the present invention. That tank is provided with an internal circulation system for maintaining liquid tack oils in an emulsified state.

In one preferred form, the emulsion tank 228 has an 80 gallon capacity and is double steel jacketed with 2" of insulation and is equipped with two heating systems. During working hours, a heat transfer system with an adjustable valve, capable of heating emulsion oil from 0° to 150° F., using the truck engine coolant system as the heat source. The oil pump and all lines are in an insulated heated area with a hot well for storing a spray wand in cold weather. The tank has an 8" fill spout and a 2" gate valve on the tank drain.

As has been mentioned, the improvements to the prior art device shown in FIGS. 3 and 4 relate primarily to the heating system used to heat the heat transfer compartment of the device shown in FIGS. 1 and 2. An all-electric heat source is associated with the heating chamber 221 for heating the chamber and for transferring heat to the hopper compartment 205 through the hopper bottom wall 207. As shown in FIGS. 1 and 2, the all-electric heat source preferably comprises a pair of oppositely arranged electric heaters 240, 242, located within the heating chamber 221 on either side of the V-shaped bottom wall of the hopper. The electric heaters are powered by an electric generator (246 in FIG. 1) also mounted on the body of the device, whereby the electric heaters can be used to supply heat to the bottom wall of the hopper to maintain the asphalt mix materials in a workable state. It is significant to note that there are no retort tubes in the new design. Instead, the electric heaters are enclosed within the 130 gallon heating chamber once the chamber is filled with heat transfer oil. The heating chamber 221 is then sealed up.

During working hours, the 130 gallon heat transfer oil heating chamber is heated by the two 208 to 240 volt AC single phase electric resistance heaters powered by a 50 amp, 12,000 watt, PTO hydraulic driven on-board electric generator (246 in FIG. 1). This exemplary system is capable of heating asphalt materials from 0° to 300° F. The electric generator could also be run off an auxiliary pony motor, or the like.

FIG. 5 is a simplified schematic of the power supply system of the system of the invention showing the truck PTO 248 being used to supply power to the hydraulic motor 250. The hydraulic motor 250 is used to power the electric generator (246 in FIGS. 1 and 5). The electric power generator 246 is used to power the two electric resistance heaters 240, 242, located in the heating chamber 221.

FIG. 6 is a simplified view of a typical truck powered PTO (shown generally at 250) connected by a U-joint assembly 252 to the drive shaft 254 for the hydraulic pump (motor) used to power the electric generator 246. The truck powered PTO is preferably a transmission mounted constant mesh PTO with direct mount load sense hydraulic pump. In one exemplary case, the system features a PTO hot shift direct mount driven piston type load sense variable displacement 2000 psi@900 rpm pump, or engine crankshaft constant mesh driven 6.0 cu. in. load sense pump.

For non-working hours, the asphalt aggregate hopper compartment 205 can be heated in any convenient manner. For example, the compartment could be heated by two 220 VAC, 3,500 watt, 16 amp explosion proof heaters. The emulsion tank can be heated by one 220 VAC, 1, 350 watt, 6 amp dry-well heater. These system are thermostatically controlled and are supplied from a 25 foot cord with ground fault interrupt system. This type heating system, for non-duty hours is capable of maintaining heated material up to 300° F. in the hopper and up to 200° F. in the emulsion tank.

In operation, the heat transfer oil in the heating chamber 221 is heated by the two electric resistance heaters 240, 242, which, in turn, heat the asphalt mix in the hopper compartment 205. The heat transfer oil in the heating chamber 221 is sealed off and does not intermix with the emulsion or tack oil contained in the separate tank 228. At the job site, suitable hydraulic tools are connected to outputs from the hopper compartment and the emulsion tank so that repairs can be quickly accomplished. Spray equipment such as a conventional wand can be connected to a discharge valve for dispensing liquid asphalts or emulsions to seal and tack the dressed cavity. The screw conveyor 227 is then actuated to dispense asphalt mix materials from the hopper compartment 205 through the discharge chute into the cavity as required. The filled cavity can then be compacted with a hydraulic tamper to complete the job.

In addition to the previously described apparatus used in the practice of the invention, there is also provided an improved method for repairing a pothole in an asphalt pavement, comprising the steps of:

providing a body on a portable base for transporting the body to a repair site, the body being equipped with a hopper compartment with a V-shaped bottom wall for transporting asphalt mix materials and a generally V-shaped heating chamber located below the hopper compartment, the V-shaped bottom wall of the hopper compartment defining an upper extent of the heating chamber; providing a screw conveyor mounted in the bottom of the hopper compartment for dispensing asphalt mix materials therefrom;

providing a paddle shaft located above the screw conveyor in the hopper compartment for agitating the hopper materials;

utilizing an all-electric heat source associated with the heating chamber for heating the chamber and for transferring heat to the hopper compartment through the hopper bottom wall to maintain the asphalt mix materials in a workable state; and dispensing asphalt mix materials from the hopper compartment to fill and repair the pothole.

As has been described with respect to the apparatus of the invention, heat is supplied to the heating chamber by means of a pair of oppositely arranged electric heaters located within the heating chamber on either side of the V-shaped bottom wall of the hopper, the electric heaters being heated by an electric generator also mounted on the body of the device, whereby the electric heaters can be used to supply heat to the bottom wall of the hopper to maintain the asphalt mix materials in a workable state.

An invention has been provided with several advantages. The device is simpler in design and more economical to manufacture than some of the prior art devices of the same general type. The heat system utilized also heats more efficiently in some outside environments. Once the electric heaters get the hopper compartment hot, it stays hot for an extended period of time. The use of the submerged electric heaters in the sealed heating chamber has been found to increase the life expectancy of the electric generator by 50% over prior art systems. Since the heating chamber is sealed, it is only infrequently necessary to replenish the heat transfer medium or maintain such medium.

While the invention has been shown in several of its forms, it is not thus limited but is susceptible to various changes and modifications without departing from the spirit thereof, as described in the claims which follow.

What is claimed is:

1. A portable device for transporting asphalt repair materials for use in repairing potholes in asphalt pavements, the device consisting of:

a body adapted to be mounted on a portable base for transporting the body to a repair site, the body having a hopper compartment with a V-shaped bottom wall for transporting asphalt mix materials and a generally V-shaped heating chamber located below the hopper compartment, the V-shaped bottom wall of the hopper compartment defining an upper extent of the heating chamber;

an auger mounted in the bottom of the hopper compartment for dispensing asphalt mix materials therefrom;

a paddle shaft located above the auger in the hopper compartment for agitating the hopper materials;

an all-electric heat source associated with the heating chamber for heating the chamber and for transferring heat to the hopper compartment through the hopper bottom wall wherein the all-electric heat source comprises a pair of oppositely arranged submerged electric heaters located within the heating chamber on either side of the V-shaped bottom wall of the hopper, the electric heaters being heated by an electric generator also mounted on the body of the device, whereby the electric heaters can be used to supply heat to the bottom wall of the hopper to maintain the asphalt mix materials in a workable state;

wherein the submerged electric heaters are the sole heat source for transferring heat to the hopper compartment and are used as an alternative to retort gas burners; and wherein the heating chamber is a sealed heat transfer oil chamber, the chamber being sealed once the electric heaters are installed and the chamber is filled with heat transfer oil.

2. The device of claim 1, wherein the V-shaped bottom wall of the hopper compartment forms an upper, uninsulated common wall of the heating chamber, the heating chamber having an insulated bottom wall and insulated side walls.

3. The device of claim 2, wherein the electric heaters which make up the all-electric heat source for the hopper compartment are 208 to 240 volt AC single phase electric resistance heaters.

4. The device of claim 3, wherein the on-board electric generator which is used to power the electric heaters is a PTO hydraulically driven generator.

5. A method of repairing a pothole in an asphalt pavement, comprising the steps of:

providing a body on a portable base for transporting the body to a repair site, the body being equipped with a hopper compartment with a V-shaped bottom wall for transporting asphalt mix materials and a generally V-shaped heating chamber located below the hopper compartment, the V-shaped bottom wall of the hopper compartment defining an upper extent of the heating chamber;

providing a screw conveyor mounted in the bottom of the hopper compartment for dispensing asphalt mix materials therefrom;

providing a paddle shaft located above the screw conveyor in the hopper compartment for agitating the hopper materials;

utilizing an all-electric heat source associated with the heating chamber for heating the chamber and for transferring heat to the hopper compartment through the hopper bottom wall to maintain the asphalt mix materials in a workable state, wherein heat is supplied to the heating chamber by means of a pair of oppositely arranged submerged electric heaters located within the heating chamber on either side of the V-shaped bottom wall of the hopper, the electric heaters being heated by an electric generator also mounted on the body of the device, whereby the electric heaters can be used to supply heat to the bottom wall of the hopper to maintain the asphalt mix materials in a workable state and wherein the submerged electric heaters are the sole heat source used for transferring heat to the hopper compartment and are used as an alternative to retort gas burners;

wherein the heating chamber is a sealable heat transfer oil chamber, the chamber being sealed once the electric heaters are installed and the chamber is filled with heat transfer oil; and dispensing asphalt mix materials from the hopper compartment to fill and repair the pothole.

6. The method of claim 5, further comprising the steps of:

providing a separate liquid asphalt tank mounted on the portable base for transporting and dispensing liquid asphalt type materials;

dispensing liquid asphalt material to dress the pothole prior to dispensing the asphalt mix materials.

7. The method of claim 5, wherein the on-board electric generator which is used to power the electric heaters is a PTO hydraulically driven generator.

\* \* \* \* \*